（12) United States Patent
Slaczka et al.

(10) Patent No.: US 11,059,223 B2
(45) Date of Patent: Jul. 13, 2021

(54) TECHNIQUES FOR METALLIC MATERIAL DEPOSITION IN ADDITIVE FABRICATION AND RELATED SYSTEMS AND METHODS

(71) Applicant: Formlabs, Inc., Somerville, MA (US)

(72) Inventors: Marcin Slaczka, Boston, MA (US); Zachary Zguris, Canterbury, NH (US); Matthew Keeter, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 161 days.

(21) Appl. No.: 15/785,981

(22) Filed: Oct. 17, 2017

(65) Prior Publication Data

US 2018/0104895 A1 Apr. 19, 2018

Related U.S. Application Data

(60) Provisional application No. 62/409,773, filed on Oct. 18, 2016.

(51) Int. Cl.
*B29C 64/40* (2017.01)
*B29C 64/188* (2017.01)
(Continued)

(52) U.S. Cl.
CPC .......... *B29C 64/188* (2017.08); *B22F 10/20* (2021.01); *B29C 33/0022* (2013.01);
(Continued)

(58) Field of Classification Search
CPC ..... B29C 64/188; B29C 64/386; B29C 64/40; B29C 64/336; B29C 33/0022;
(Continued)

(56) References Cited

U.S. PATENT DOCUMENTS 4,217,182 A 8/1980 Cross et al.
4,748,104 A 5/1988 Ferrier et al.
(Continued)

FOREIGN PATENT DOCUMENTS

AT 13 536 U1 2/2014
CN 105834422 A 8/2016
(Continued)

OTHER PUBLICATIONS

International Search Report and Written Opinion for International Application No. PCT/US2017/56941 dated Jan. 2, 2018.
(Continued)

*Primary Examiner* — Jeffrey M Wollschlager
*Assistant Examiner* — Xue H Liu
(74) *Attorney, Agent, or Firm* — Wolf, Greenfield & Sacks, P.C.

(57) ABSTRACT

According to some aspects, a method is provided of forming a metallic object via additive fabrication, the method comprising obtaining a geometric description of a first object with an exterior surface, generating a geometric description of a second object, the second object bounded by the exterior surface of the first object and having one or more voids, fabricating said second object via additive fabrication based on said geometric description of the second object, and depositing a metallic material onto said second object, wherein the metallic material is deposited into said voids of second object.

12 Claims, 5 Drawing Sheets

(51) Int. Cl.

| | |
|---|---|
| *B22F 10/20* | (2021.01) |
| *B29C 64/386* | (2017.01) |
| *B29C 64/336* | (2017.01) |
| *B29C 33/00* | (2006.01) |
| *B29C 33/38* | (2006.01) |
| *B29C 33/44* | (2006.01) |
| *B29C 37/00* | (2006.01) |
| *C23C 18/16* | (2006.01) |
| *B22F 1/00* | (2006.01) |
| *B33Y 50/02* | (2015.01) |
| *B22F 3/24* | (2006.01) |
| *B22F 10/30* | (2021.01) |
| *B33Y 10/00* | (2015.01) |
| *B33Y 40/00* | (2020.01) |
| *C23C 18/32* | (2006.01) |

(52) U.S. Cl.
CPC ........ *B29C 33/3835* (2013.01); *B29C 33/448* (2013.01); *B29C 37/0025* (2013.01); *B29C 64/336* (2017.08); *B29C 64/386* (2017.08); *B29C 64/40* (2017.08); *C23C 18/1641* (2013.01); *B22F 1/0062* (2013.01); *B22F 10/30* (2021.01); *B22F 2003/247* (2013.01); *B22F 2998/10* (2013.01); *B22F 2999/00* (2013.01); *B33Y 10/00* (2014.12); *B33Y 40/00* (2014.12); *B33Y 50/02* (2014.12); *C23C 18/1644* (2013.01); *C23C 18/32* (2013.01); *Y02P 10/25* (2015.11)

(58) Field of Classification Search
CPC .............. B29C 33/3885; B29C 33/448; B29C 37/0025; B33Y 10/00; B33Y 40/00
USPC ........................................................ 264/401
See application file for complete search history.

(56) References Cited

U.S. PATENT DOCUMENTS

| | | |
|---|---|---|
| 4,915,983 A | 4/1990 | Lake et al. |
| 5,296,189 A | 3/1994 | Kang et al. |
| 2013/0299214 A1 | 11/2013 | Frey et al. |
| 2014/0335313 A1 | 11/2014 | Chou et al. |
| 2015/0048209 A1 | 2/2015 | Hoyt et al. |
| 2015/0080495 A1 | 3/2015 | Heikkila |
| 2015/0193559 A1 | 7/2015 | Musuvathy |
| 2016/0152314 A1 | 6/2016 | Carlsten et al. |

FOREIGN PATENT DOCUMENTS

| | | |
|---|---|---|
| EP | 3 050 650 A1 | 8/2016 |
| WO | WO 97/09125 A1 | 3/1997 |
| WO | WO 2013/010108 A1 | 1/2013 |
| WO | WO 2014/179822 A1 | 11/2014 |
| WO | WO 2015/006434 A1 | 1/2015 |

OTHER PUBLICATIONS

Extended European Search Report for European Application No. EP 17862597.6 dated Mar. 10, 2020.
International Preliminary Report on Patentability for International Application No. PCT/US2017/056941 dated May 2, 2019.

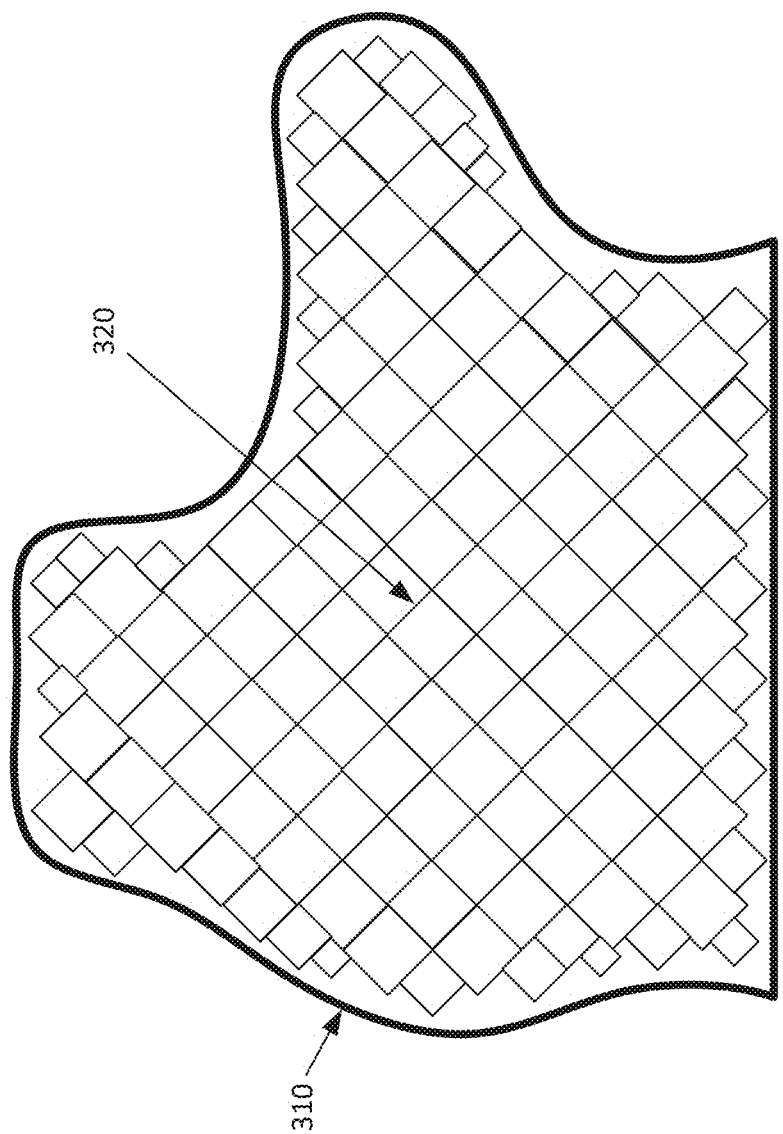

TECHNIQUES FOR METALLIC MATERIAL DEPOSITION IN ADDITIVE FABRICATION AND RELATED SYSTEMS AND METHODS

CROSS-REFERENCE TO RELATED APPLICATIONS

The present application claims the benefit under 35 U.S.C. § 119(e) of U.S. Provisional Patent Application No. 62/409,773, filed Oct. 18, 2016, titled "Techniques for Metallic Material Deposition in Additive Fabrication," which is hereby incorporated by reference in its entirety.

FIELD OF INVENTION

The present invention relates generally to systems and methods for fabricating parts using an additive fabrication (e.g., 3-dimensional printing) device that comprise a metallic material.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or the bottom surface of the build platform.

SUMMARY

According to some aspects, a method is provided of forming a metallic object via additive fabrication, the method comprising obtaining a geometric description of a first object with an exterior surface, generating a geometric description of a second object, the second object bounded by the exterior surface of the first object and having one or more voids, fabricating said second object via additive fabrication based on said geometric description of the second object, and depositing a metallic material onto said second object, wherein the metallic material is deposited into said voids of second object.

According to some aspects, a method is provided of forming an object based on a skeleton structure formed by an additive fabrication device, the object to be formed by a process of depositing a material onto the skeleton structure, the method comprising generating a geometric description of the skeleton structure based on a three-dimensional model of the object, the skeleton structure bounded by the exterior surface of the first object and having one or more voids, wherein the geometric description of the skeleton structure is arranged to be offset from an exterior surface of the first object by a distance based on an amount of deposition expected during the process of depositing a material onto the skeleton structure, and wherein the second object comprises a lattice of repeating cell units, the cell units each comprising at least one void within, and generating, using at least one processor, instructions that, when executed by the additive fabrication device, cause the additive fabrication device to fabricate the skeleton structure.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 3 illustrates a cross-section of an object for fabrication and a skeleton mesh structure configured to form the object during a subsequent deposition process;

DETAILED DESCRIPTION

Figure 1:
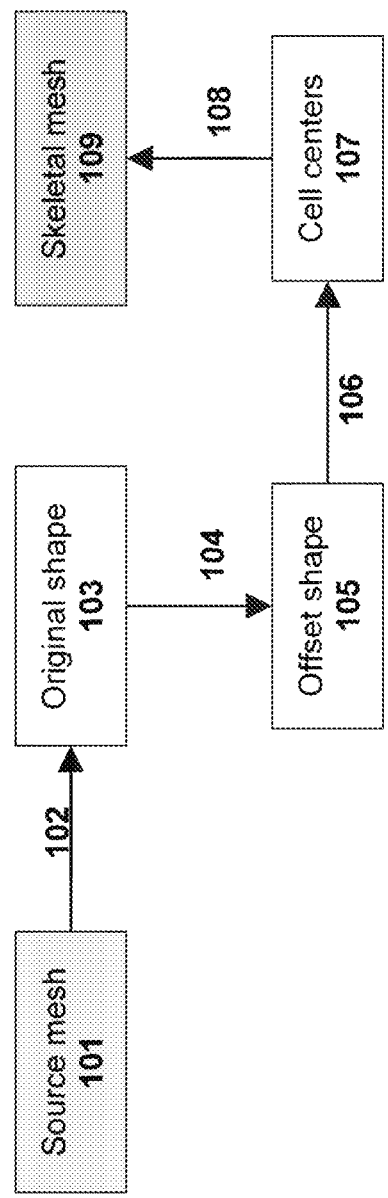
FIG. 1 is a flowchart of a method of producing a skeletal mesh part, according to some embodiments.

Various techniques can be applied for additive fabrication of objects, or "parts," out of a variety of different types of materials, including various types of plastics, ceramics, waxes, and metals. Fabrication using metals is often a desired option, but current solutions for doing so known in the art are often unsatisfactory due to excessive cost, poor performance, or other limitations.

As an example, one technique sometimes referred to as Direct Metal Laser Sintering (or DMLS) requires extensive user training, substantial servicing and postprocessing, extensive safety precautions, and expensive equipment. Other post-processing techniques, such as molten metal infiltration or casting have other disadvantages, including the use of molten metal and the various safety and equipment cost concerns that come with the use of molten metal. One technique that attempts to approximate the additive fabrication of parts from metallic materials has been to post process parts formed by additive fabrication by electroplating, wherein a relatively thin layer of metal is deposited onto the surface of an additively fabricated part. Such composite parts typically have the cosmetic appearance of metal parts and somewhat modified material properties, such as increased strength. The use of this technique, however, is limited to the deposition of relatively thin films of metal onto the exterior surface of the part, leaving the interior regions of the part unmodified. In addition, many types of part geometries may be unsuitable for use in an electroplating deposition process.

Aspects of the present invention advantageously allow for the efficient and effective additive fabrication of parts from a wide range of potential materials, including various metals. In particular, embodiments of the present invention may utilize one or more of various possible additive fabrication techniques to form a precursor part derived from the desired part and formed using a skeleton material. This precursor part, also referred to herein as a skeleton structure, may then be prepared for an electroless deposition process, wherein one or more object materials are deposited onto the skeleton structure. The resulting composite of skeleton structure and object material may then comprise a fabricated part formed substantially of deposited material. Unlike prior art deposition techniques such as electroplating, which typically result in metal deposition only on the exterior surfaces of a part, the use of the skeleton structure with a electroless deposition process allows for the formation of a part with deposition substantially throughout internal areas of the part. Such embodiments may thereby allow for the use of lower cost and highly accurate additive fabrication techniques, such as stereolithography, in the formation of the skeleton structure, while resulting in a part exhibiting substantially metallic material properties.

Parts produced using the techniques described herein may have sufficient dimensional accuracy for immediate use, while in some cases, a produced part may be considered to be a "near net" shape part that may be further modified by other shaping processes. For instance, processes suitable for use with metal objects, such as computer controlled milling, may be applied to the near net shape part in order to produce a final part of the desired dimensions.

According to some embodiments, in an initial step, an additive fabrication device may fabricate a skeleton structure for a desired part using various techniques and using one or more suitable materials. Suitable materials may include those capable of providing initiating deposition sites for the metal deposition in subsequent deposition processes. In some embodiments, it may be advantageous for the skeleton structure to be fabricated out of a "metallic material," referred to herein as any material or combination of materials capable of conducting an electrical current. For example a metallic material may comprise one or more conductive metals, conductive polymers, and/or conductive polymer composites. In other embodiments, conductivity may be not be desirable and other materials may be utilized to deposit material over a skeleton structure.

Any technique for shaping a suitable material to form the skeleton structure, including both additive and subtractive methods may potentially be utilized. Most advantageously, however, embodiments of the invention may form the skeleton structure layer-by-layer out of one or more suitable skeleton materials using additive fabrication techniques. In some embodiments, traditional subtractive techniques such as machining or lithographic etching may be utilized in order to form the skeleton.

According to some embodiments, the geometry of the fabricated skeleton structure may substantially control the deposition of metallic material during steps subsequent to fabrication of the skeleton structure. Some suitable deposition processes, such as the illustrative example of electroless deposition used herein, may deposit material at known rates that are uniform throughout the skeleton structure at a given point in time without requiring the use of an electrical charge or current applied to the part in order to initiate deposition reactions.

In at least some use cases, the most advantageous processes may be those in which deposition occurs spontaneously and selectively from solution onto deposition sites in response to environmental changes, such as changes in pressure or temperature. Accordingly, in some embodiments, skeleton structure geometries may be configured with elements that are positioned and/or shaped so as to influence the location of metallic material deposition. For instance, one or more computing devices, located within an additive fabrication device and/or separate from the additive fabrication device, may apply various algorithmic and heuristic techniques in order to derive one or more suitable skeleton structures to be formed in the above manner and used in subsequent metallic material deposition steps. Alternatively, or additionally, manual input (e.g., by a user) may be utilized when generating and/or modifying a skeleton structure.

According to some embodiments, deposition during electroless deposition of metallic material onto a skeleton structure may begin on surface regions of the skeleton structure. Such a deposition process may continue while the electroless deposition reaction chemistry is favorable and until the metallic deposition front from one portion of the skeleton structure intersects with the metallic deposition front from another portion of the skeleton structure, and/or until previously deposited metallic material occludes portions of the skeleton structure from access to additional deposition material. The location, shape and/or orientation of the skeleton structure's structural elements, such as the distance between elements surrounding a void space within the skeleton, for example, may substantially control the extent and timing of deposition of material filling said void.

As one example of determining a shape of a skeleton structure, the shape of a skeleton structure may be calculated by analyzing the geometrical structure of a desired part and generating a space-filling lattice with approximately the same dimensions as the part. Such a lattice as referred to herein is a three-dimensional shape that includes repeated structures (e.g., primitive cells) and that fills less than all of the volume it occupies. For instance, a lattice may be produced from regular tiling in three-dimensions of a primitive cell that includes a three-dimensional structure which fills less than all of the unit cell. According to some embodiments, a skeleton structure may be described by such a lattice.

In general, when a skeleton structure is described by a lattice, it may be preferable for the lattice structure to be minimal, in terms of volume, while still providing sufficient structure for voids within the lattice to be filled during the deposition process. As referred to herein, a void refers to an empty space within a skeleton structure around which portions of the lattice are positioned. Interior voids are important features of a skeleton structure because they provide space for a material layer to grow outward from the lattice structure as deposition is performed. Moreover, how the size of such voids compare with the degree by which the skeleton structure is arranged to be smaller than the desired part is also important. If the voids are too large, for instance, the part may have sufficient material deposition to be the desired size yet the voids may not yet be filled.

According to some embodiments, a minimal volume for the lattice structure may be determined for a part, which may provide a maximal degree of metallization. A minimal volume may be a minimum volume possible for a chosen material from which the skeleton structure will be fabricated and a fabrication technique that will be used to fabricate the skeleton structure.

The inventors have recognized and appreciated that a key aspect to the herein described techniques lies in the selection of cell sizes (e.g., the sizes of repeated primitive cells) within the lattice structure. When generating a lattice structure to represent the skeleton structure that will be fabricated, various different sizes for the cells of the lattice may be selected. In some embodiments, lattice cells may be of constant size and volume throughout the skeleton structure. In general, larger cell volumes may result in fabricated parts with higher percentages of metallization, due to a reduction in the total volume of the skeleton structure. Larger lattice cell volumes, however, may result in lower final resolution and decreased part accuracy in the final part, following deposition. This is due, in part, to the fact that larger lattice cells may generally not able to capture smaller features in the desired part.

In some embodiments, lattice cell sizes for one or more types of primitive cells used to describe a skeleton structure may be selected to vary with position within the structure based on various parameters, including location within the skeleton structure, depth from the surface, and/or other parameters, such as the order in which cells are fully enclosed by deposited material. As one example, lattice cells containing parts of the skeleton structure that form the eventual surface of the fabricated part may be selected to be smaller than lattice cells that contain bulk parts of the skeleton structure. Such an approach may produce higher effective resolutions for surface features. Variable cell sizes for skeleton elements may increase the chance for certain portions of the skeleton structure to be prematurely enclosed by deposited metallic material, such that deposition voids may be left without access to fresh deposition material. In such cases, it may be advantageous to generate skeleton structures having a shape such that access to such voids is preserved during the deposition process.

In some embodiments, certain processing steps may occur prior to the electroless deposition process to prepare the skeleton structure for subsequent steps. As an example, depending on the fabrication method chosen, certain post-processing steps may be advantageous, such as actinic radiation post-curing and cleaning of resin residue for parts formed by stereolithographic techniques. In some embodiments, specific processing steps may be applied to skeleton structures that would otherwise be less suited or unsuitable for subsequent electroless deposition processes. As one example, skeleton structures fabricated from a material that is unsuited to a particular electroless deposition process may be coated with one or more coating materials which are more suited to the electroless deposition process. Said coatings may be applied in various ways, such as electroplating, powder coating, spraying, and/or other techniques.

According to some embodiments, a skeleton structure may undergo an electroless deposition process. Suitable electroless deposition processes result in the deposition of a material, such as a metallic material, onto the skeleton structure. In particular, the electroless deposition process may result in deposition material being preferentially attracted to the skeleton structure material, as well as previously deposited material. As a result, deposition material may be deposited to an increasingly greater depth as the electroless deposition process continues, proceeding outwards from one or more of the skeleton structure's surfaces. As described above, the geometry of the skeleton structure may be advantageously chosen so as to cause advancing areas of deposition to intersect, such as within internal voids within the skeleton structure, so as to produce a final part with the desired amount of fill by the deposited material.

The following description is provided to further illustrate certain aspects of the present invention, according to some embodiments. In an initial step, a part is chosen for fabrication. A geometrical description of said part is analyzed and a geometrical description of a skeleton structure for the part is calculated. In some use cases, for example, the geometry for a desired part may be skeletonized by causing uniform voids to be formed throughout the part such that all such voids form an open-celled uniform lattice structure. As one example, a skeleton structure may be formed from a regular cubic lattice structure with rectangular prism cells. Geometric models of such skeleton geometries may be formed from the source part geometry. As one example, a regular cubic lattice structure may be generated in a volume sufficient to completely enclose the dimensions of the source part. Said lattice structure may then be combined with the geometry of the source part by the application of a geometric Boolean intersection between the lattice structure and the geometry of the source part, using a suitable algorithm.

An illustrative process for determining a skeleton structure based on the shape of a part to be fabricated, is depicted in FIG. 1. A source polygonal mesh 101 is provided in any suitable format describing a manifold closed surface for the ultimately desired part. For subsequent processing, said mesh is converted 102, or rasterized, into a voxel-based representation 103 that closely approximates the volume enclosed within the source mesh. Such voxelization may be performed in a variety of ways, including by use of the OpenVDB library available at http://www.openvdb.org/. In general, the inventors have found rasterization of 10 voxels per millimeter of part dimension to be sufficient resolution for acceptable results. Following the voxelization process, the volume of the voxel model is reduced by offsetting 104 the surface of the voxel model by the approximate depth of the expected deposition process. Such offsetting may be performed in any number of ways, including by use of the LevelSetFilter offset functionality included within the Open VDB library. In some embodiments, the inventors have found an expected deposition of 2 millimeters, and thus an offset of 2 millimeters to provide acceptable results.

The offset part shape 105 may then be further processed in step 106 in order to identify the center of each voxel fully contained within the offset shape 105, thus forming an array of cell centers 107. In a subsequent step 108, the cell centers 107 and one or more cell shapes and sizes may be selected in order to form a structure within the offset volume 105 of the desired part. This skeletal mesh structure 109 may be a lattice of repeating cell units positioned at the determined cell centers. Various cell geometries may be used for the repeating cell units, provided that the geometry allows for a cell to be connected to surrounding cells, such as a cubic or octahedral cage of struts connecting each lattice cell to neighboring cells, with each strut comprised of a cylindrical or rectangular prism shape.

In some embodiments, the inventors have found cell units comprising a plurality of interconnected cylindrical struts, with diameters of approximately 500 microns, to provide acceptable results. While the dimensions and shape of said cells may vary, the inventors have found uniform cells having a diameter approximately equal to twice the expected deposition depth, plus the cell strut diameter, to provide acceptable results. Such cells should advantageously allow for the deposition process to fill as much of the interior space of the cell as possible, while allowing deposition material to continue to penetrate into cells located deeper within the lattice structure.

Figure 2B:
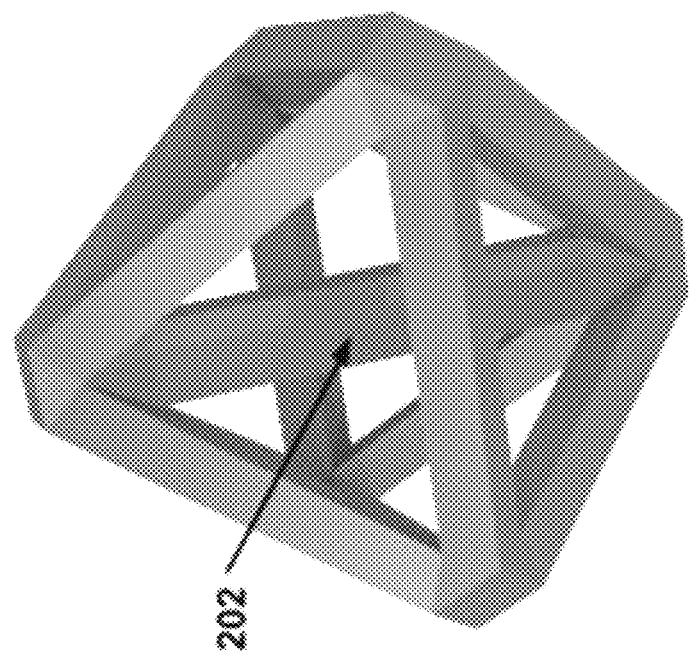
FIGS. 2A-B illustrate lattice structures suitable for forming a skeleton mesh part, according to some embodiments.
Figure 2A:
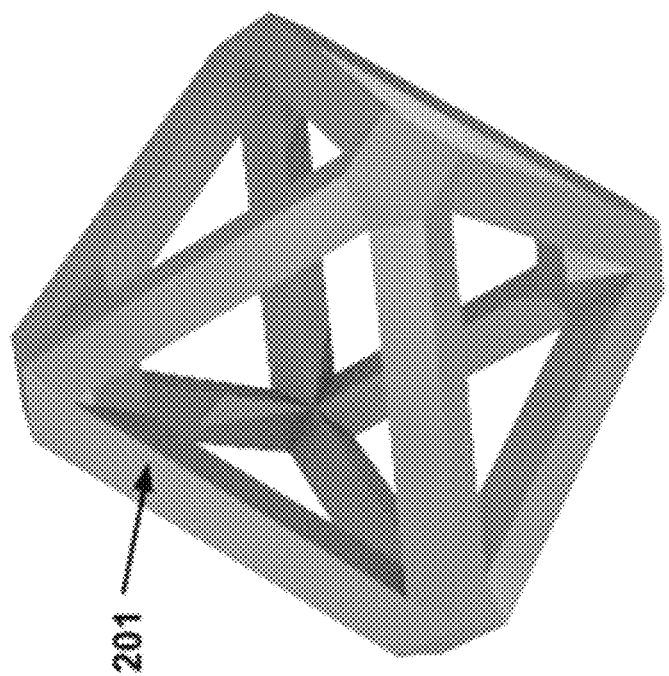

The inventors have recognized and appreciated that a regular lattice structure with modified octahedral shaped cells 201, as shown in FIGS. 2A-B, may provide a volume-efficient structure for forming the skeleton structure. In particular, the inventors have found that the addition of a central support pillar 202, as shown in FIG. 2B, to a diamond-based lattice may avoid the formation of a central void within the lattice cell due to depositions on the side elements prematurely enclosing the interior portion of the cell volume.

In some embodiments, skeleton structures may be formed from struts having square cross sections of approximately 0.2 mm by 0.2 mm. In some use cases, this cross section may be held constant as the size of the lattice cell increases, thus decreasing the proportion of skeleton material to deposited metal. Larger lattice cells, however, may tend to reduce the surface finish and accuracy of the final fabricated part. In some embodiments, the inventors have selected a ratio of material volume to void volume within a lattice cell of 4:1, such that typical openings between struts in the cell were approximately 0.8 mm in width and height.

Following the selection of cell shape and size, the lattice structure of repeating cell shapes may be created in order to form the skeleton structure. The geometrical description of this structure may be maintained in various formats, such as polygon meshes or voxels and combined, such as by a Boolean intersection, with the voxel model of the offset part. Ideally, the said combination results in the placement of cells at the center points of voxels. In some embodiments, portions of cell structures which extend beyond the surface of the voxel model may be removed and any resulting open edges to the cell lattice patched to in order to form a closed lattice structure. The resulting lattice structure may then be prepared into any suitable format for subsequent fabrication steps.

Skeleton structure 109 may then be fabricated in any number of ways, as described above, including by the use of stereolithographic techniques, such as in the Form 2 3D printer. In this illustrative embodiment, standard photopolymer resins may be used that are compatible with the Form 2 3D printer, such as any acrylate-based and radical-cured photopolymer resin with sensitivity to 405 nm actinic radiation. While such materials may be easily fabricated, typical photopolymer resins may not provide appropriate nucleation sites for subsequent electroless deposition processes. As a result, one or more steps may be taken in order to prepare the skeleton structure for deposition of material.

According to some embodiments, a skeleton structure may be prepared for deposition of material by coating the skeleton structure with an atomized metallic material powder, such as a spherical 325 aluminum mesh powder. The skeleton structure may optionally be coated with an adhesive (e.g., contact adhesive) prior to the introduction of the atomized metallic material powder.

In some embodiments, in addition to, or as an alternative to, the use of one or more adhesives, residual adhesive properties of uncured photopolymer resin on the surface of the skeleton structure may be exploited to adhere atomized and/or powdered metallic material onto the surface of the skeleton structure. When exploiting adhesive properties of resin, exposure of the powder-coated skeleton structure to additional actinic radiation may be advantageous to complete the curing process and secure adhered powder to the surface of the skeleton structure. In some embodiments, a full post cure cycle of 60 minutes at 60° C. under 405 nm light at 2.5 mW/cm$^2$ has been applied to powder-coated parts.

In some embodiments, extraneous, unsecured powder may be removed from the surface of the skeleton structure prior to subsequent steps, such as by use of compressed air and/or vibration. In some embodiments, removal of unsecured powder may be accomplished by washing the part with isopropyl alcohol of at least 90% concentration, followed by hot tap water to remove any loose metallic particles.

Any suitable metallic material, including any powdered conductive material or materials, may be applied to the surface of a skeleton structure based upon the chemistry of the electroless deposition process chosen. For example, powdered aluminum may be applied to a skeleton structure via any of the techniques described above.

In some embodiments, atomized powder material may be introduced directly into the liquid, uncured, photopolymer resin prior to its use in the fabrication process. Such an introduction of resin causes the formed skeleton structure to present exposed powder particles at the surface, thus providing initiation sites for subsequent chemical reactions. For example, 1-5% by weight of an atomized aluminum powder may be introduced into Version 2 of Formlabs Clear General Purpose Resin, a methacrylate photopolymer resin commercially available from Formlabs, Inc. As yet another example, an initiator package including 2-(2-bromoisobutyrloxy)ethyl methacrylate (BrMA) may be incorporated into the photopolymer material and metal deposited onto it such as described by Wang and Zhou in *Initiator-Integrated 3D Printing Enables the Formation of Complex Metallic Architectures*, published in ACS Applied Materials & Interfaces, December 2013 (DOI: 10.1021/am4050822), incorporated herein by reference.

Following preparation of the skeleton structure, the electroless deposition process may then begin. In this illustrative example, an electroless nickel plating system may be utilized in order to deposit nickel onto the skeleton structure, using electroless plating techniques. As will be appreciated, an electroless plating procedure may differ from more commonly employed electrolytic plating procedures in that it does not require electrical connections of any kind. Instead, the deposition is generated by the reaction of different solutions, heated to appropriate temperatures in a reaction vessel. The skeleton structure to be plated may then be added to the reaction vessel, advantageously suspended or mounted to allow for optimal fluid flow. This connection may be made by unwaxed string, polymer filament, stainless steel wire, existing support structures, or other sacrificial features added to the skeleton. Deposition will then begin spontaneously onto the surface of the skeleton structure, said surface providing initiation sites. In some cases, the chemical mixture used within the reaction chamber may demand ongoing tracking and maintenance of chemical levels in order to ensure that the desired reactions take place. In the present example, electroless nickel plating materials available from Caswell Inc. were utilized, following the Electroless Nickel Plating Tutorial procedure published by Caswell Inc.

In general, various chemistries of electroless processes are possible, said chemistries typically comprised of ion sources, such as a nickel salt of hypophosphorous acid, a reducing agent, such as sodium hypophosphite, sodium borohydride, dimethylamine borane, or hydrazine, complexing agents, and/or various stabilizers or inhibitors.

One important requirement of this process may be consideration of the "maximum load" of the electroless plating solution. That is, a given volume of an electroless plating solution, such as that provided by Caswell Inc., may typically be used to plate no more than a given surface area of material. As an example, a 5 Pint Solution Kit, again available from Caswell Inc., is recommended only for the plating of up to 75 in² of surface material.

A skeleton structure determined for a desired part generally has a greater surface area than that of the desired part. The surface area of the skeleton structure can be calculated using any of various methods of calculating the surface area of a 3D model, and the calculated surface area used when determining the load of an electroless plating solution. In some cases, the effective surface area for calculations used in determining the load of the plating solution may be most optimally expressed as an integration over the surface area of the skeleton over time.

In some embodiments, a surface area used in determining the load of a plating solution may be assumed not to decrease during a deposition time period, thus providing a conservative estimate. Following the completion of the deposition process, the skeleton structure, plus deposited material, may be removed from the reaction vessel and extraneous material removed using deionized water or other cleaning fluid. The chemicals used within the reaction chamber may, in many cases, be retained and reused, provided that maximum reaction limits have not yet been reached.

Following plating, various post processing techniques may be chosen in order to improve the material properties or surface finish of the plated parts. As one example, plated parts may undergo additional subtractive processing steps, such as CNC precision milling, sanding, and/or other polishing. Additionally, or alternatively, plated parts may undergo additional plating steps, such as electroplating or electroless plating in order to deposit additional material onto the surface.

In some embodiments, plated parts may be subjected to a "burn-out" step that removes material used to fabricate the skeleton. Volumes previously occupied by the skeleton structure that are now empty as a result of the burn-out process may then be filled with one or more materials, such as via processes for introducing metallic material into void spaces of sintered parts. As a result, the final part may substantially comprise only metallic materials due to the removal and replacement of the skeleton structure.

Computational models and experimental validation may be used in order to better model and optimize the metallic material deposition process. As one example, deposition may be modelled as a morphological dilation applied to a surface of the skeleton structure model until said surface is no longer accessible to the bulk of the bath. At that point, the surface may be determined to be isolated from the deposition chemistry in the bulk of the deposition bath, such that the reactants are used up and plating halts early. The model may be constructed in the following manner, considering a point i in 3D space. First, the model may define d(i) as the Euclidean distance to the surface of the model at point i. As will be appreciated, there are arbitrarily many paths from a point i to the outside of the model. Accordingly, for a given path p, we define D(p) as the minimum model-path distance as that path is traversed such that the following relationship is maintained:

$$D(p) = \min_{i \in p} d(i)$$

As deposition material migrates to the surface for potential deposition, the carrier liquid must traverse one or more internal restrictions caused by the skeleton structure and/or deposited material upon said skeleton. These restrictions may, if sufficiently narrow "necks", prevent further deposition at location i. Accordingly, for a particular location i, the model should determine the size least narrow path, calculating the following relationship:

$$p_{best}(i) = \mathrm{argmax}_{p} D(p)$$

Based upon this finding, the model should assume deposition of metallic material at location i if and only if the following equation is true, given a target plating depth of material t:

$$d(i) \leq t \text{ and } D(p_{best}(i)) = d(i)$$

Based upon the preceding parameters, a simulation strategy may be chosen to use a discrete-space model. The discrete grid is treated as an graph connected along faces, edges, and corners. In this discrete grid, solving for $p_{best}(i)$ is isomorphic to Dijkstra's algorithm with mapping shown in the following table:

TABLE 1

Isomorphism between Dijkstra's algorithm and dilation

|  | Dijkstra | Dilation |
| --- | --- | --- |
| Initial node value | 0 | D(i) |
| Initial background value | ∞ | 0 |
| Accumulation | Σ | min |
| Comparison | min | max |

The results of such simulations have been found to reflect empirical results. Accordingly, such simulations may be used in order to select optimal parameters for properties such as planting depths and skeleton structures in order to achieve particularly desired outcomes in the final process.

FIG. 3 illustrates a cross-section of an object for fabrication and a skeleton mesh structure configured to form the object during a subsequent deposition process. To depict one possible skeleton structure for a given object, the example of FIG. 3 shows a cross section of a skeleton structure 320 that has been determined based on an object 310. As discussed above, a desired object may be fabricated by initially generating a skeleton structure for that object that, when subsequently fabricated by an additive fabrication device and then subjected to a material deposition process, will result in the desired object. As such, the skeleton 320 is configured both according to the object 310 and according to a known deposition process that will subsequently be applied to the skeleton after its fabrication. The illustrative skeleton 320 is formed from a lattice (of which the cross section is shown) and includes smaller lattice structures close to the surface of the object so that greater detail may be produced at the surface (where it will be visible) while using less material to form the skeleton in the interior of the object at the cost of reduced detail (where it will not be visible).

Figure 4:
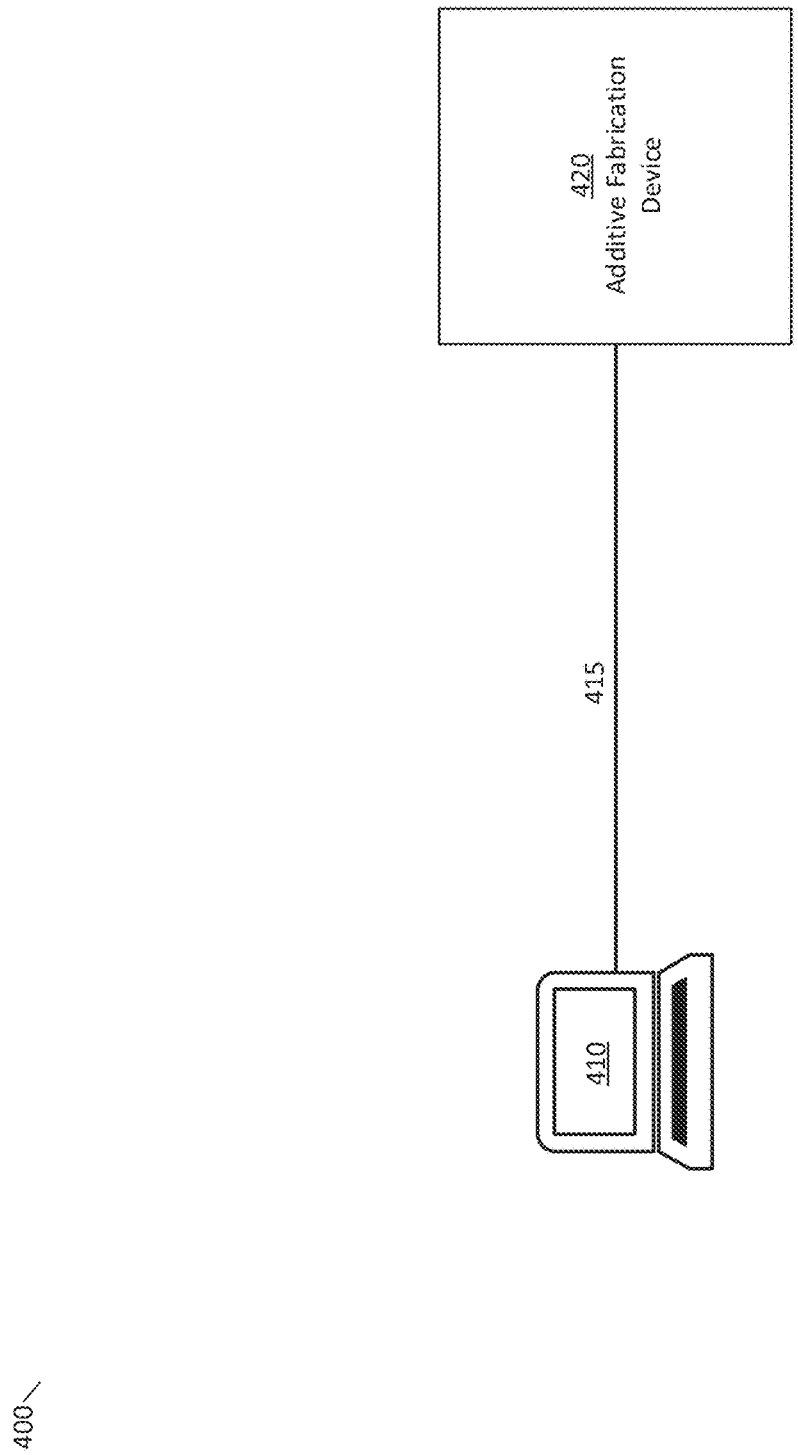
FIG. 4 is a block diagram of a system suitable for practicing aspects of the invention, according to some embodiments.

FIG. 4 is a block diagram of a system suitable for practicing aspects of the invention, according to some embodiments. System 400 illustrates a system suitable for generating instructions to perform additive fabrication by an additive fabrication device and subsequent operation of the additive fabrication device to fabricate an object. For instance, instructions to fabricate a skeleton structure as described herein may be generated within system 400 and the structure may then be fabricated. Various parameters associated with an intended metallic deposition process may be stored by system 400 and accessed when generating a skeleton structure so that the fabricated skeleton is configured for use with that deposition process.

According to some embodiments, computer system 410 may execute software that generates two-dimensional layers that may each comprise sections of an object, such as a skeleton structure. Instructions may then be generated from this layer data to be provided to an additive fabrication device, such as additive fabrication device 420, that, when executed by the device, fabricates the layers and thereby fabricates the object. Such instructions may be communicated via link 415, which may comprise any suitable wired and/or wireless communications connection. In some embodiments, a single housing holds the computing device 410 and additive fabrication device 420 such that the link 415 is an internal link connecting two modules within the housing of system 400.

Figure 5:
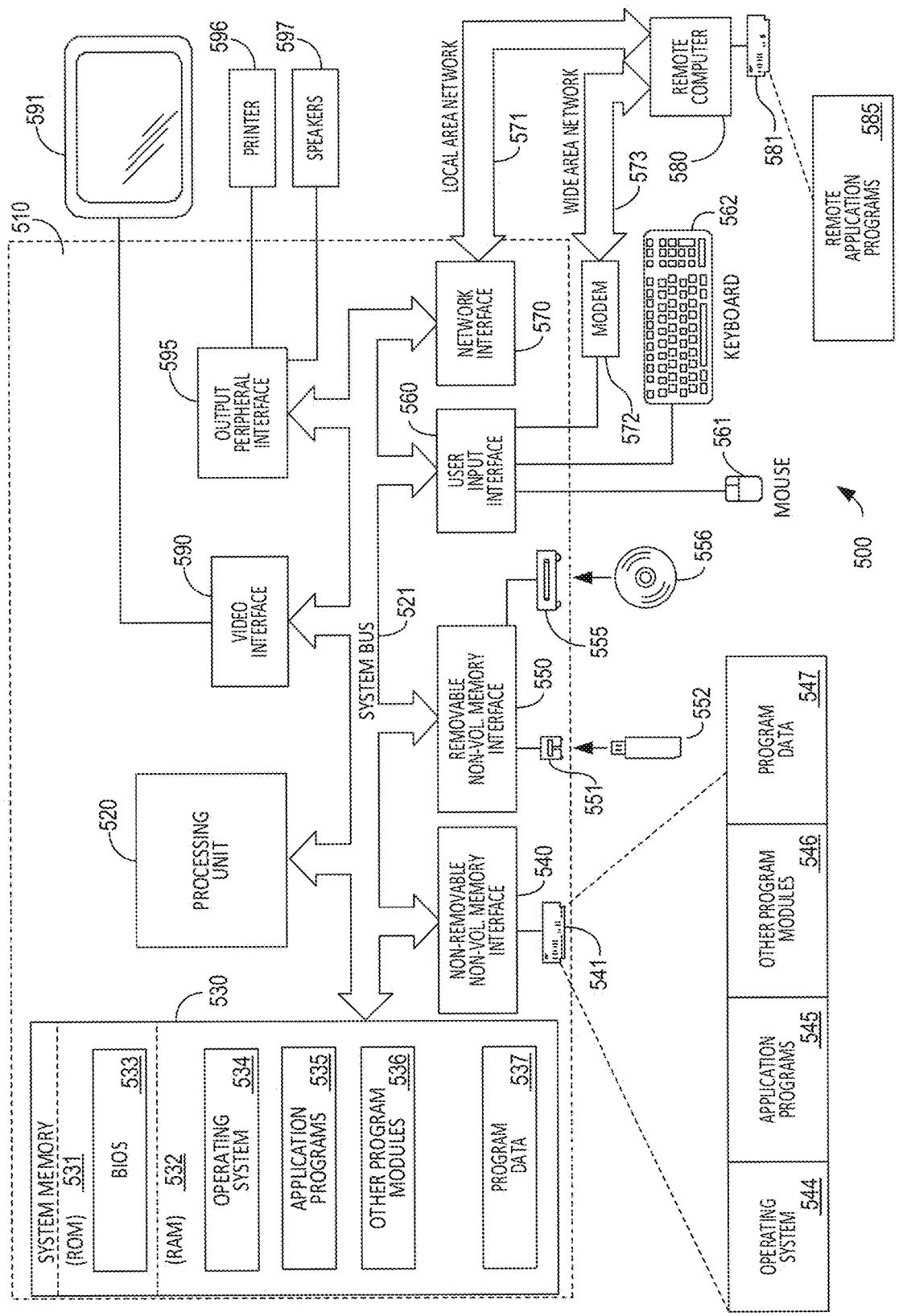
FIG. 5 illustrates an example of a computing system environment on which aspects of the invention may be implemented.

FIG. 5 illustrates an example of a suitable computing system environment 500 on which the technology described herein may be implemented. For example, computing environment 500 may form some or all of the computer system 410 shown in FIG. 4. The computing system environment 500 is only one example of a suitable computing environment and is not intended to suggest any limitation as to the scope of use or functionality of the technology described herein. Neither should the computing environment 500 be interpreted as having any dependency or requirement relating to any one or combination of components illustrated in the exemplary operating environment 500.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the technology described herein includes a general purpose computing device in the form of a computer 510. Components of computer 510 may include, but are not limited to, a processing unit 520, a system memory 530, and a system bus 521 that couples various system components including the system memory to the processing unit 520.

The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a flash drive 551 that reads from or writes to a removable, nonvolatile memory 552 such as flash memory, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of forming an object via additive fabrication and metallic deposition, the method comprising:
    obtaining a geometric description of the object, the geometric description of the object defining an exterior surface;
    generating a geometric description of a skeleton structure based on the geometric description of the object, the skeleton structure being completely bounded by the exterior surface of the object and having one or more voids;
    fabricating the skeleton structure via additive fabrication based on said geometric description of the skeleton structure; and
    depositing, subsequent to fabrication of the skeleton structure, a metallic material onto the fabricated skeleton structure, wherein the metallic material is deposited into the one or more voids of the skeleton structure and fills at least some of the one or more voids, thereby forming the object,
    wherein said depositing step comprises an electroless plating process.

2. The method of claim 1, wherein said depositing step deposits the metallic material over the entire surface of the skeleton structure at a constant rate.

3. The method of claim 1, wherein the geometric description of the skeleton structure is arranged to be offset from the exterior surface of the object by a distance based on an amount of deposition expected during the step of depositing the material onto the skeleton structure.

4. The method of claim 1, wherein the skeleton structure comprises a lattice of repeating cell units, the cell units each comprising at least one void within.

5. The method of claim 4, further comprising determining sizes of the cell units of the lattice based on the geometric description of the object.

6. The method of claim 5, wherein sizes of the cell units of the lattice increase in size with increasing depth from surfaces of the object.

7. The method of claim 1, further comprising removing the skeleton structure subsequent to deposition of the metallic material.

8. The method of claim 1, wherein depositing the metallic material onto said skeleton structure comprises depositing at least some of the metallic material within an interior of the skeleton structure.

9. The method of claim 7, further comprising depositing additional metallic material into void spaces left by removal of the skeleton structure.

10. A method of forming an object based on a skeleton structure formed by an additive fabrication device, the object to be formed by a process of depositing a material onto the skeleton structure, wherein said process of depositing comprises an electroless plating process, the method comprising:

generating a geometric description of the skeleton structure based on a three-dimensional model of the object, the skeleton structure being completely bounded by the exterior surface of the object and having one or more voids, wherein the geometric description of the skeleton structure is arranged to be offset from an exterior surface of the object by a distance selected based on an amount of deposition necessary to fill at least some of the one or more voids during the process of depositing a material onto the skeleton structure subsequent to its fabrication, wherein said process of depositing comprises an electroless plating process, and wherein the skeleton structure comprises a lattice of repeating cell units, the cell units each comprising at least one void within; and generating, using at least one processor, instructions that, when executed by the additive fabrication device, cause the additive fabrication device to fabricate the skeleton structure.

11. The method of claim 10, wherein generating the geometric description of the skeleton structure further comprises determining sizes of the cell units of the lattice based on the three-dimensional model of the object.

12. The method of claim 11, wherein sizes of the cell units of the lattice increase in size with increasing depth from surfaces of the object.

* * * * *